C. L. Gilpatric,
Nutmeg Grater,
No. 58,632. Patented Oct. 9, 1866.
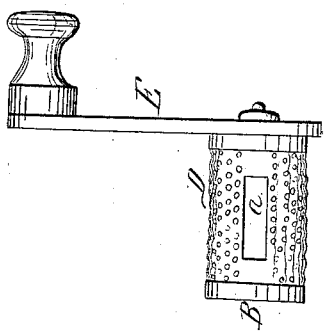
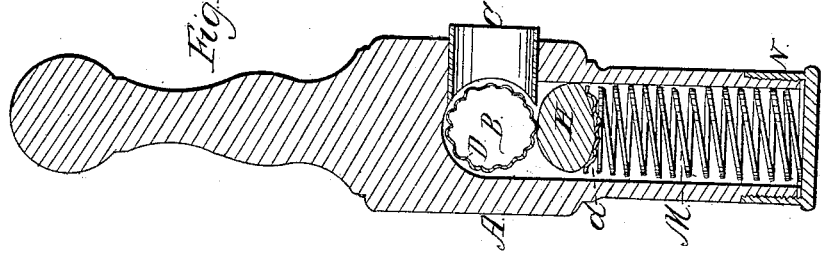
Witnesses
Inventor

UNITED STATES PATENT OFFICE.

C. L. GILPATRIC, OF SOUTH DEDHAM, MASSACHUSETTS.

IMPROVED NUTMEG-GRATER.

Specification forming part of Letters Patent No. 58,632, dated October 9, 1866.

*To all whom it may concern:*

Be it known that I, C. L. GILPATRIC, of South Dedham, county of Norfolk, and State of Massachusetts, have invented certain new and useful Improvements in Nutmeg-Graters, and do hereby declare that the following is a full, clear, and exact description of the same, reference being had to the accompanying drawings, and the letters of reference marked thereon, making a part of this specification.

Figure 1 represents a vertical section of the nutmeg-grater. Fig. 2 represents the spool and crank which form a part of the same.

In the drawings herewith presented, and forming a part of this specification, A represents a suitable wooden or metal block, which is made in a quadrilateral form at its center, provided with a suitable handle at the top, and made cylindrical beneath the quadrilateral, all of which uses will be hereinafter set forth.

At or near the center of the quadrilateral is cut a circular opening. Within the said opening is a spool, B, made similar to the ones with thread on them in common use. This spool extends from side to side of the block A, and is allowed to revolve within the opening made to receive it.

D represents a piece of perforated tin, which is wound around the spool B and secured to the same. Said tin has an oblong slot, *a*, made in it to receive the nutmeg after being ground.

E represents a crank, which is attached to one end of the spool B, for the purpose of turning the same. C is a circular opening cut in the quadrilateral, and extends from the outside of the same to the spool B, for the purpose of allowing the nutmeg to be discharged after being ground.

M represents a spiral spring, which is attached to the cap N at the bottom of the block, and extends from said cap to a suitable distance near the spool B. At the end of the spring M, and secured to it, is a concaved piece of tin, *d*, with perforations in the same, whereon the nutmeg H is placed. The cap N is screwed to the bottom of the block A, and can be taken from it, carrying the spring M and disk *d*, whenever it is so desired.

It will readily be seen by this invention that the nutmeg can be ground in a very short time and effectually done. The nutmeg is placed upon the disk *d*, as shown in the annexed drawings, and by means of the spring is held against the perforated tin D of the spool B on the one side and the disk *d* on the other. The crank, revolving the spool and tin D, effectually grinds the nutmeg, and the opening C, being held downward, allows the ground nutmeg to pass from the grater.

In revolving the spool it will be seen that much of the ground nutmeg passes into the perforations, whereas the oblong slot in the tin D will allow it to pass from the same.

The spool B is held securely in its place by a plate and screw on the opposite side from the crank E.

Having thus fully described my invention, what I claim as new, and desire to secure by Letters Patent, is—

The case A, as constructed in combination with the spool B, secured in said case and provided with the perforated covering D, in which is cut an opening, *a*, which discharges the ground nutmeg, which passes into the spool, and by means of which the spool may be cleansed internally, the several parts being arranged as and for the purpose herein specified.

As evidence that I claim the foregoing I have hereunto set my hand in the presence of two witnesses.

C. L. GILPATRIC.

Attest:
ADOLPHUS DAVIS,
E. R. WIGGIN.